United States Patent
Iwata

(10) Patent No.: US 9,588,818 B2
(45) Date of Patent: Mar. 7, 2017

(54) PARALLEL COMPUTER SYSTEM AND METHOD FOR ALLOCATING JOBS TO CALCULATION NODES

(71) Applicant: FUJITSU LIMITED, Kawasaki-shi, Kanagawa (JP)

(72) Inventor: Akitaka Iwata, Ichinomiya (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/666,353

(22) Filed: Mar. 24, 2015

(65) Prior Publication Data
US 2015/0277982 A1  Oct. 1, 2015

(30) Foreign Application Priority Data
Mar. 31, 2014 (JP) .................. 2014-072704

(51) Int. Cl.
G06F 9/46 (2006.01)
G06F 9/50 (2006.01)

(52) U.S. Cl.
CPC ............ G06F 9/5038 (2013.01); G06F 9/505 (2013.01)

(58) Field of Classification Search
CPC ...... G06F 9/4848; G06F 9/485; G06F 9/4881; G06F 9/5038; G06F 9/505
See application file for complete search history.

(56) References Cited

U.S. PATENT DOCUMENTS 8,214,836 B1 * 7/2012 Markov ............... G06F 9/4881
                                                          718/102
2006/0106931 A1   5/2006 Richoux
2008/0253287 A1 * 10/2008 Gupta .................... H04L 47/10
                                                          370/235

FOREIGN PATENT DOCUMENTS

| JP | 07-141305 | 6/1995 |
| JP | 2006-146864 | 6/2006 |
| JP | 2008-107875 | 5/2008 |

* cited by examiner

Primary Examiner — Camquy Truong
(74) Attorney, Agent, or Firm — Fujitsu Patent Center

(57) ABSTRACT

A parallel computer system includes a plurality of calculation nodes and a job management apparatus to allocate jobs to the plurality of calculation nodes. The job management apparatus includes a controller to execute a process including searching a vacant resource generated as a result of job allocation, the vacant resource including one or more of the plurality of calculation nodes each having a vacant state in a range between current time and a scheduled start time point of a certain allocated job, retrieving the job allocatable to the vacant resource, from the unallocated jobs when the vacant resource is found, and allocating the retrieved job to the vacant resource.

8 Claims, 13 Drawing Sheets

PARALLEL COMPUTER SYSTEM AND METHOD FOR ALLOCATING JOBS TO CALCULATION NODES

CROSS-REFERENCE TO RELATED APPLICATION

This application is based upon and claims the benefit of priority of the prior Japanese Patent Application No. 2014-072704, filed on Mar. 31, 2014, the entire contents of which are incorporated herein by reference.

FIELD

Disclosure relates to a parallel computer system, a control program for a job management apparatus, and a control method for the parallel computer system.

BACKGROUND

A parallel computer system is known, in which a job scheduler performs the scheduling for previously allocating a plurality of jobs to calculation resources, and the jobs allocated to the calculation resources are sequentially executed. FIG. 1 illustrates a flow of general job allocation performed by a job scheduler, and FIG. 2 illustrates a flow chart illustrating a flow of a "job selection" process and a "calculation resource selection" process.

The job allocation is performed as follows. As illustrated in FIG. 1, the job scheduler accepts jobs submitted by respective users in a "job acceptance" process. The job scheduler coordinates the submitted jobs at constant intervals, and the job scheduler executes the job selection process.

In the job selection process, at first, the job scheduler rearranges (sorts) all of the plurality of jobs (jobs waiting for execution) as targets of the job selection process in accordance with predetermined priorities (for example, the fairware control and the group priority control) (1 in FIG. 2). Subsequently, the job scheduler takes out the job disposed at the head from a sorted job sequence, and the job is set to a variable "JOB" (2 in FIG. 2). Subsequently, the job scheduler calls a subroutine for the calculation resource selection process so that the calculation resource is allocated to the job set to the variable "JOB" (3 in FIG. 2).

In the calculation resource selection process, any calculation resource in a vacant state (vacant resource) is searched in accordance with the required quantity of the job (for example, the number of calculation node or nodes required to execute the job, the shape of the calculation node, and the required time for execution of the job (limiting value of the elapsed time)), and the job is allocated to the calculation resource. The calculation resource selection process is executed for all of the jobs which form the job sequence (see the loop of 4 in FIG. 2). Each of the jobs, to which the calculation resource is allocated, is executed by using the allocated calculation resource, if the current time becomes the scheduled start time ("JOB EXECUTION" in FIG. 1).

The situation of allocation of the calculation resources with respect to the respective jobs can be expressed by a scheduling map M as illustrated in FIG. 1. In the scheduling map M, for example, the vertical axis represents the axis of the calculation resource, and the horizontal axis represents the time axis, wherein the line segments in the horizontal direction, which form the lattice of the calculation resource and the time, indicate the unit time, and the line segments in the vertical direction indicate the unit of the calculation resource. The unit of the calculation resource is referred to as "calculation node". The calculation node is formed by a single processor (for example, CPU) or a plurality of processors (processor group).

The respective jobs waiting for execution are allocated one by one to the calculation resource so that the execution is successively started in an order starting from those having high priorities in accordance with the job selection process and the calculation resource selection process described above. However, the job (backfill job), which is the target of the backfill scheduling, is allocated to the calculation resource while overtaking the jobs having high priorities within a range in which the execution start is not disturbed for the jobs having priorities higher than that of the job.

For more information, see Japanese Patent Laid-Open Publication No. 07-141305, Japanese Patent Laid-Open Publication No. 2008-107875, and Japanese Patent Laid-Open Publication No. 2006-146864.

SUMMARY

However, in the case of the related technique described above, the following problem arises. That is, any gap of the calculation resource in the vacant state (vacant resource), in which no job is allocated to a certain calculation node or nodes in relation to a certain time period (period of time), is generated in some cases as a result of the allocation of the jobs. If any unallocated job can be allocated to the gap as described above, the operating ratio (availability) of the calculation resource (calculation node) is improved in the time period.

On the contrary, the unallocated jobs are allocated one by one to the calculation resource in accordance with the priorities. Therefore, even when the job, which can be allocated to the gap, exists in the unallocated jobs at a certain point in time, if the priority of the job is low, then it takes a long time to wait until the turn comes to perform the allocation of the job. As a result, the time length of the gap becomes shorter than the time required to execute the job on account of the elapse (change) of the current time, at the point in time at which the allocation of the job is performed, and it is impossible to allocate the job. In such a case, the gap is the useless vacant resource.

One of embodiments is a parallel computer system including a plurality of calculation nodes and a job management apparatus configured to allocate jobs to the plurality of calculation nodes. The job management apparatus includes a controller configured to execute a process including searching a vacant resource generated as a result of job allocation, the vacant resource including one or more of the plurality of calculation nodes each having a vacant state in a range between current time and a scheduled start time point of a certain allocated job, retrieving the job allocatable to the vacant resource, from the unallocated jobs when the vacant resource is found, and allocating the retrieved job to the vacant resource.

The target and advantages of the invention will be realized and attained by the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

An embodiment of the present invention will be explained below with reference to the drawings. The configuration of the embodiment is provided by way of example. The present invention is not limited to the configuration of the embodiment.

First Embodiment

At first, an explanation will be made about the "calculation resource" (hereinafter simply referred to as "resource" in some cases) as the target of the job allocation process performed by the job scheduler. Prior to the execution start of a certain job, the processor (generally a plurality of processors (processor group)) for executing the job is allocated to the job. The processor or the processor group as described above corresponds to the "resource". The management unit of the calculation resource formed by the processor or the processor group is referred to as "calculation node".

In the job allocation process, the job scheduler allocates not only the calculation node for executing the job but also the "time period in which the job can use the calculation node (time period in which the calculation node is used for the execution of the job)". Therefore, the combination of the "calculation node" and the "time period in which the calculation node can be used" is the "resource" as the target of the allocation.

The allocation of the calculation node to the job is sometimes referred to as "calculation resource allocation on the spatial axis" for the convenience of explanation based on the use of the scheduling map. On the other hand, the allocation of the time period for using the calculation node to execute the job is sometimes referred to as "calculation resource allocation on the time axis". The "calculation resource allocation" is simply referred to as "resource allocation" in some cases as well.

Figure 3:
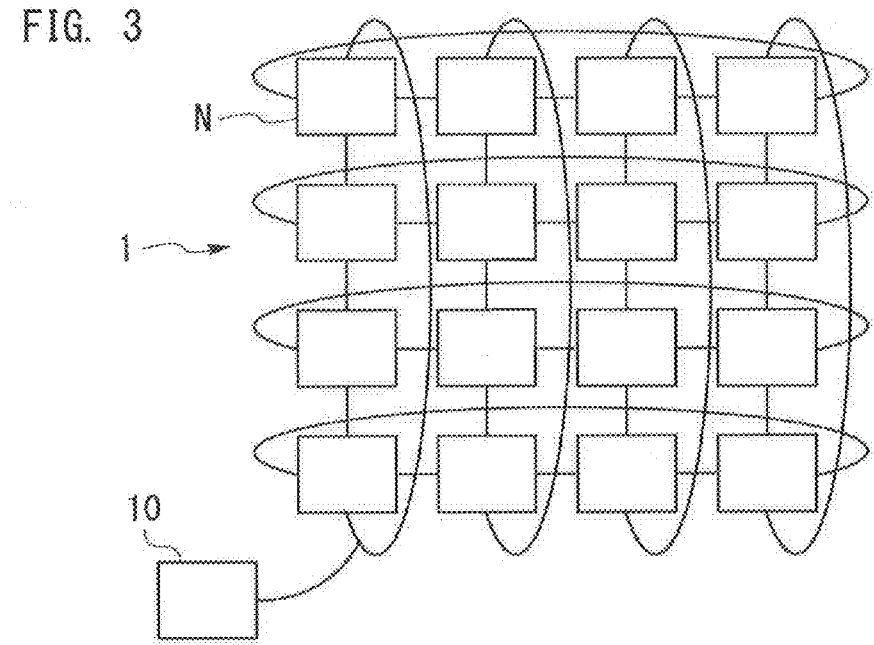
FIG. 3 illustrates an example of a two-dimensional torus network formed by calculation node groups, depicting an exemplary entire structure of a parallel computer system according to an embodiment.
Figure 4:
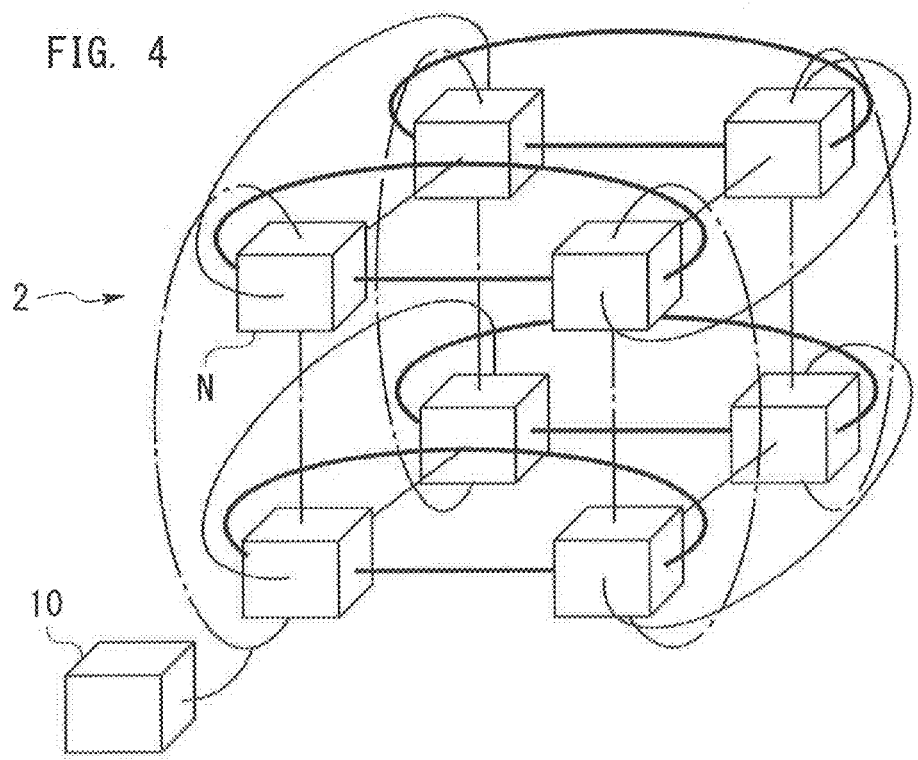
FIG. 4 illustrates an example of a three-dimensional torus network formed by calculation node groups, depicting an exemplary entire structure of a parallel computer system according to an embodiment.

This embodiment assumes such a case that the spatial arrangement of the set of the calculation nodes to which the jobs are allocated (strictly the network connection relation) is a two-dimensional or three-dimensional mesh or a two-dimensional or three-dimensional torus. FIG. 3 exemplifies a two-dimensional torus network (network 1) formed by calculation nodes N of 4×4, and FIG. 4 exemplifies a three-dimensional torus network (network 2) formed by calculation nodes N of 2×2×2. However, the numbers of the calculation nodes N illustrated in FIGS. 3 and 4 are illustrated by way of example. The network, which has a predetermined number of calculation nodes N, is applied.

In the case of the spatial arrangement of the calculation nodes as described above, it is possible to approve that the set of the calculation nodes is arranged in the shape of rectangle or rectangular parallelepiped. However, in the case of the explanation in which the spatial arrangement of the calculation nodes is not referred to, the set of the calculation nodes is also represented by the one-dimensional line segments in some cases as illustrated in the scheduling map depicted in FIG. 1 in order to simplify the explanation.

The condition, under which the spatial arrangement of the calculation nodes is limited to the two-dimensional or three-dimensional mesh or the two-dimensional or three-dimensional torus, is often adopted for the system in which the entire network resides in the mesh or torus connection, for the following reason. That is, it is intended to avoid any interference exerted on the communication between the calculation nodes for a certain job by the communication for any other job.

As described above, the scheduling map M illustrated in FIG. 1 is an example in which the calculation nodes are represented one-dimensionally. On the contrary, in the case of the parallel computer system in which the calculation nodes are connected by the two-dimensional or three-dimensional mesh network or the two-dimensional or three-dimensional torus network, the calculation nodes of the number required by the job are allocated to the job in accordance with the following method. That is, in the case of the two-dimensional network, the rectangle of the continuous calculation nodes is allocated to the job. In the case of the three-dimensional network, the rectangular parallelepiped of the continuous calculation nodes is allocated to the job. The allocation method as described above is adopted for the following reason.

(1) The communication between the processes in the job does not behave as any disturbance for other jobs.

(2) If any abnormality of the calculation node (for example, any down of the calculation node) arises, no influence is exerted on a large number of jobs (only the job, which uses the calculation node subjected to the occurrence of abnormality, is interrupted).

However, the state, in which the network topology of the calculation nodes is the two-dimensional or three-dimensional mesh or the two-dimensional or three-dimensional torus, is not the essential requirement. It is possible to apply any network topology other than the above.

<Configuration of Parallel Computer System>

The parallel computer system according to this embodiment includes the network 1 or the network 2 which is illustrated in FIG. 3 or 4, and a job management apparatus 10 which is connected to the network 1 or the network 2 and which allocates the jobs to the network 1 or the network 2 (plurality of calculation nodes). The connection relation between the network illustrated in FIGS. 3 and 4 respectively and the job management apparatus 10 is illustrated schematically.

Figure 5:
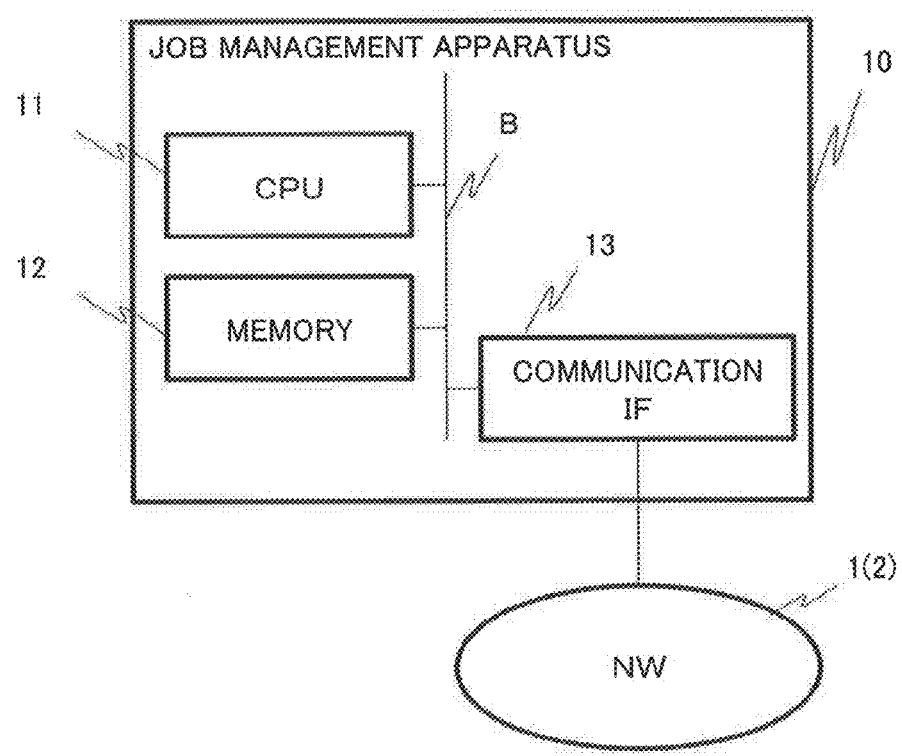
FIG. 5 illustrates an exemplary hardware structure of a job management apparatus illustrated in FIG. 4.

FIG. 5 illustrates an exemplary hardware configuration of the job management apparatus. The job management apparatus 10 is a computer including a processor and a memory. As for the job management apparatus 10, it is possible to apply a dedicated computer or a general purpose computer such as a personal computer (PC) or a work station (WS).

With reference to FIG. 5, the job management apparatus 10 includes a Central Processing Unit (CPU) 11, a memory 12, and a communication interface (communication IF) 13 to make communication with the network 1 or the network 2 which are connected to one another via a bus B. CPU 11 is an example of a processor, a control device, or a controller.

The memory 12 includes a nonvolatile storage medium and a volatile storage medium. The nonvolatile storage medium is, for example, at least one of Read Only Memory (ROM), Hard Disc Drive (HDD), Solid State Drive (SSD), Electrically Erasable Programmable Read-Only Memory (EEPROM), and flash memory, which stores program(s) to be executed by CPU 11 and data to be used when the program is executed. The volatile storage medium is, for example, Random Access Memory (RAM), which is used as a working area for CPU 11 and a data storage area. The memory 12 is an example of one of a "storage", "memory" and the "storage medium".

The communication IF 13 is a device or circuit which handles signal conversion and protocol conversion concerning communications. CPU 11 operates as a job scheduler by loading and executing the program stored in the memory 12 so that the jobs are allocated to the plurality of calculation nodes for forming the network 1 or the network 2.

Figure 1:
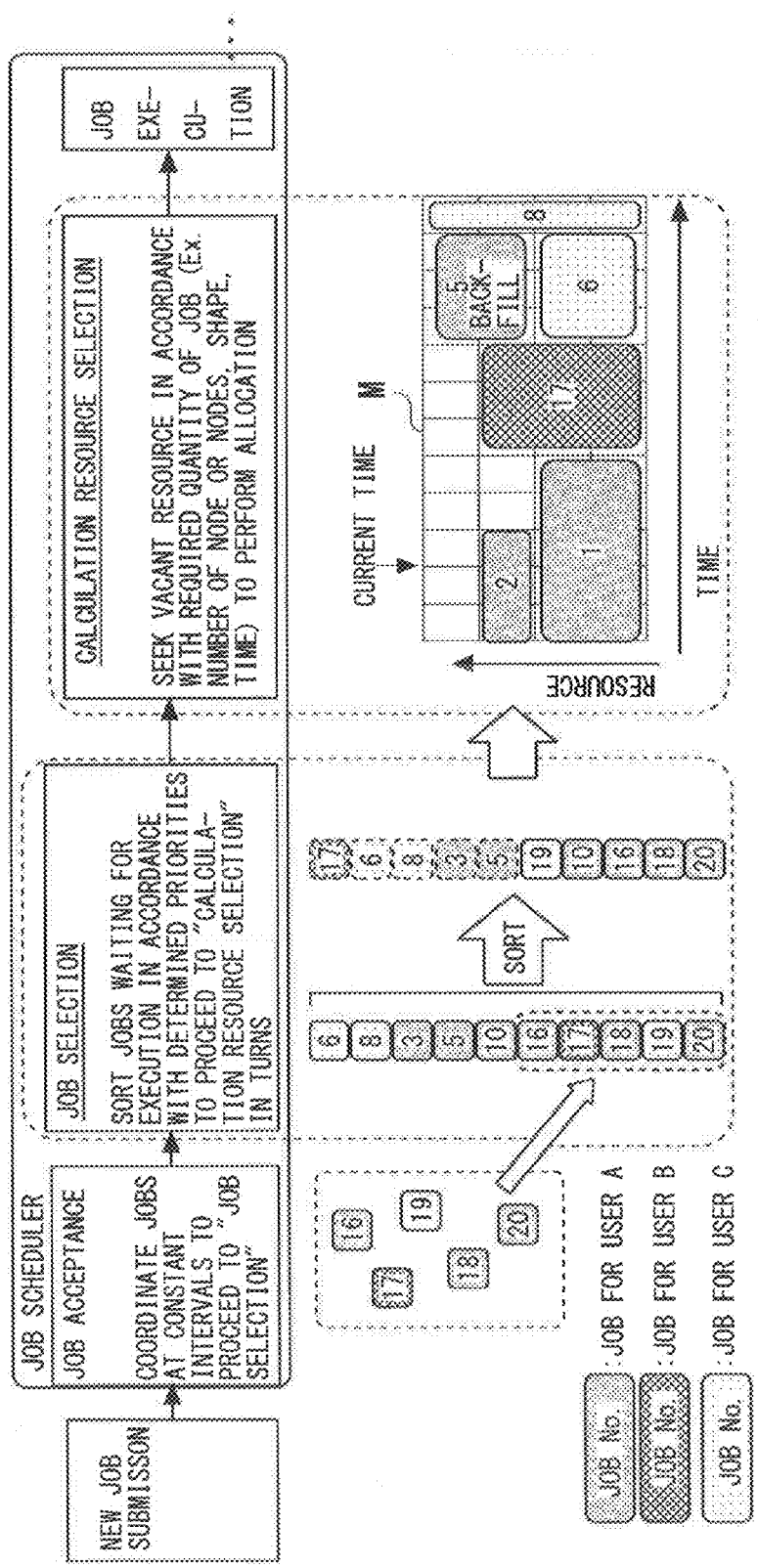
FIG. 1 illustrates a flow of general job allocation performed by a job scheduler.

CPU 11 of the job management apparatus 10 operates as the job scheduler by executing the program. Accordingly, CPU 11 can perform, as the job scheduler, the respective processes of "job acceptance", "job selection", "calculation resource selection", and "job execution" as illustrated in FIG. 1.

<Resource Map>

Figure 6:
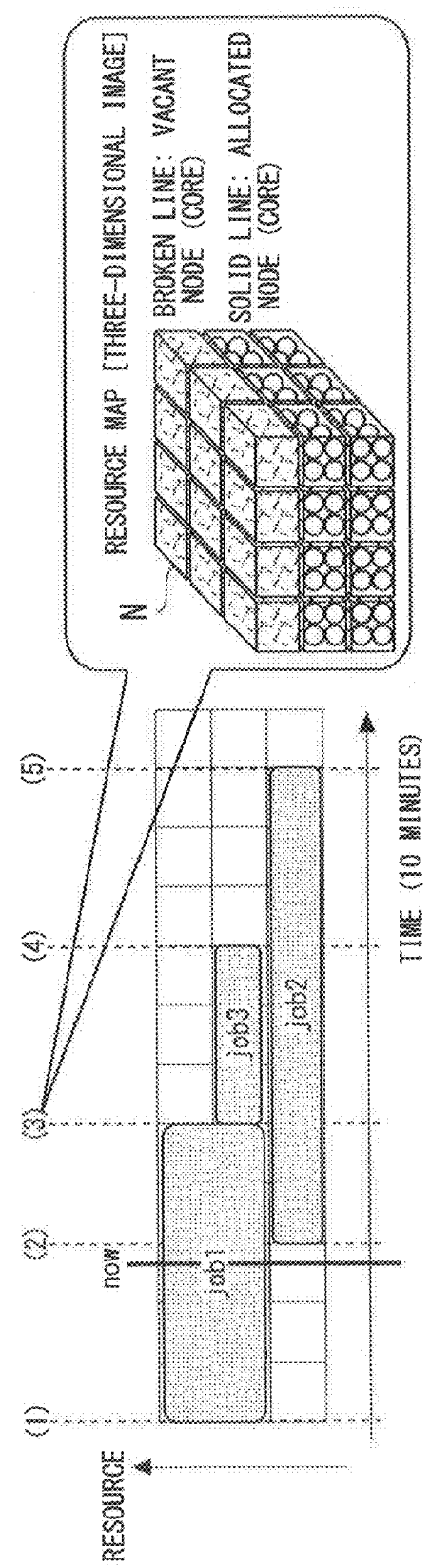
FIG. 6 illustrates a resource map to be used in a calculation resource selection process in the embodiment.

In the vacant resource search process executed by the job management apparatus 10, a "resource map" is used in order to search the vacant resource in consideration with the time axis. FIG. 6 illustrates an example of the resource map represented on the scheduling map. The resource map is a snap shot of the situation of use of the resources generated for the scheduled start time point and the scheduled end time point of the execution of the job allocated to the calculation resources. The resource map is also referred to as "map structure". The information of the resource map is prepared for the scheduled start time point and the scheduled end time point of the job, for example, upon the allocation of the job, and the information is stored in the memory 12.

In the example illustrated in FIG. 6, the resource maps (1) and (3) are prepared before and after (at the scheduled start time point and the scheduled end time point of) the job "job1", the resource maps (2) and (5) are prepared before and after the job "job2", and the resource maps (3) and (4) are prepared before and after the job "job3". Furthermore, the resource map of the current time (now map) is prepared.

In the case of the parallel computer system in which the network for connecting the calculation nodes is the three-dimensional torus network (network 2), each of the resource maps is a snap shot of a plurality of calculation nodes formed to provide a rectangular parallelepiped as a whole as illustrated by [THREE-DIMENSIONAL IMAGE] in FIG. 6. In the example illustrated in FIG. 6, the rectangular parallelepiped is the set of the calculation nodes N of 4×3×3 aligned in the width, depth, and height directions.

The three-dimensional image illustrated in FIG. 6 depicts the resource map (3), illustrating that the calculation node groups, which are included in the calculation node groups stacked to provide the three stages and which are disposed at the first stage and the second stage as counted from the bottom, reside in the allocated nodes allocated to the job "job3", and the calculation node group, which is disposed at the uppermost stage, resides in the calculation nodes (vacant nodes: vacant resource) in the vacant state (unallocated state).

Reference Example

Figure 7:
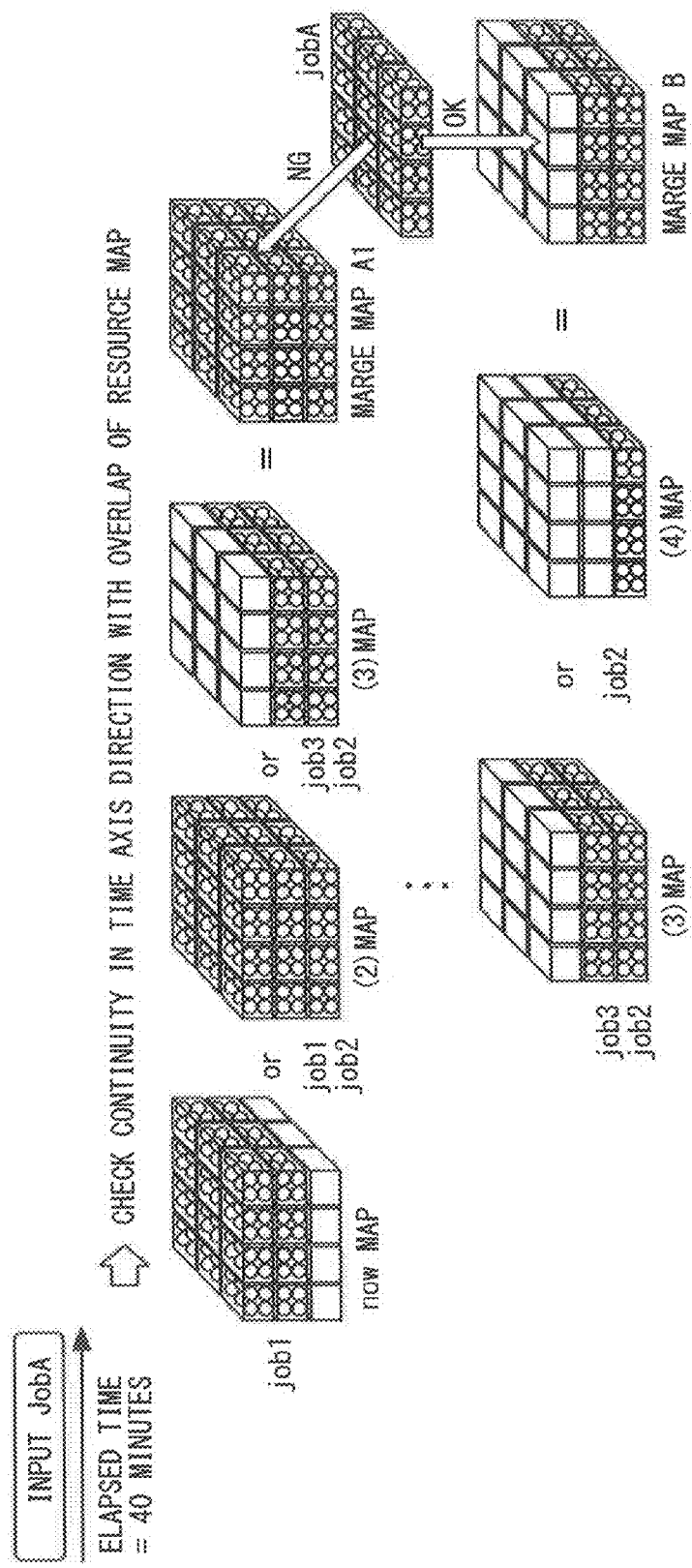
FIG. 7 illustrates Reference Example, depicting a summary of a vacant resource search process when a job "jobA" having an elapsed time of 40 minutes is allocated by using the resource map in the state illustrated in FIG. 6.

Next, an explanation will be made about Reference Example of the vacant resource search process using the resource map. FIG. 7 illustrates a summary of Reference Example of the vacant resource search process when a job "jobA" having an elapsed time of 40 minutes is allocated by the use of the resource map in the state illustrated in FIG. 6.

The elapsed time of "jobA" is 40 minutes, which requires, as the resource, the calculation node group corresponding to one stage of the rectangular parallelepiped of the calculation nodes. Therefore, the job scheduler firstly calculates a disjunction (logical sum: OR) of the now map, the resource map (2), and the resource map (3) included in a range ranging from the current time to the time point after 40 minutes to generate a merge map A1. For the calculation of the disjunction, the bit conversion value is used, in which each of the resource maps (including the now map) is converted into the bit value. In the bit conversion value, for example, the allocated area is indicated by OFF "0", and the unallocated area (in the vacant state) is indicated by ON "1". In the logical operation referred to in the following explanation, it is assumed that the bit conversion value as described above is used.

If the resource, which indicates the calculation node group in the vacant state, exists in the merge map A1, the resource indicates the calculation node group (vacant node group) which is in the vacant state continuously for 40 minutes from the current time. However, in the example illustrated in FIG. 7, any vacant node group, which can be allocated to "jobA", does not exist in the merge map A1.

Therefore, the job scheduler subsequently calculates a disjunction of the resource map (2) and the resource map (3) included in a range ranging from the time point of the resource map (2) (scheduled start time point of "job2") to the time point after 40 minutes to generate a merge map A2. However, in FIG. 7, the illustration concerning the preparation of the merge map A2 is omitted. Subsequently, the job scheduler investigates whether or not any vacant node group, to which "jobA" can be allocated, exists in the merge map A2. However, no vacant node group exists in the merge map A2 as well.

Subsequently, the job scheduler generates a merge map (merge map B) in accordance with an OR operation for the resource map (3) and the resource map (4) included in a range ranging from the time point of the resource map (3) (scheduled start time point of "job3") to the time point after 40 minutes. Subsequently, the job scheduler investigates whether or not any vacant node group, to which "jobA" can be allocated, exists in the merge map B. The vacant node group, to which "jobA" can be allocated, exists in the merge map B. Therefore, the search for the vacant node group comes to an end, and "jobA" is allocated to the found vacant node group.

Figure 8:
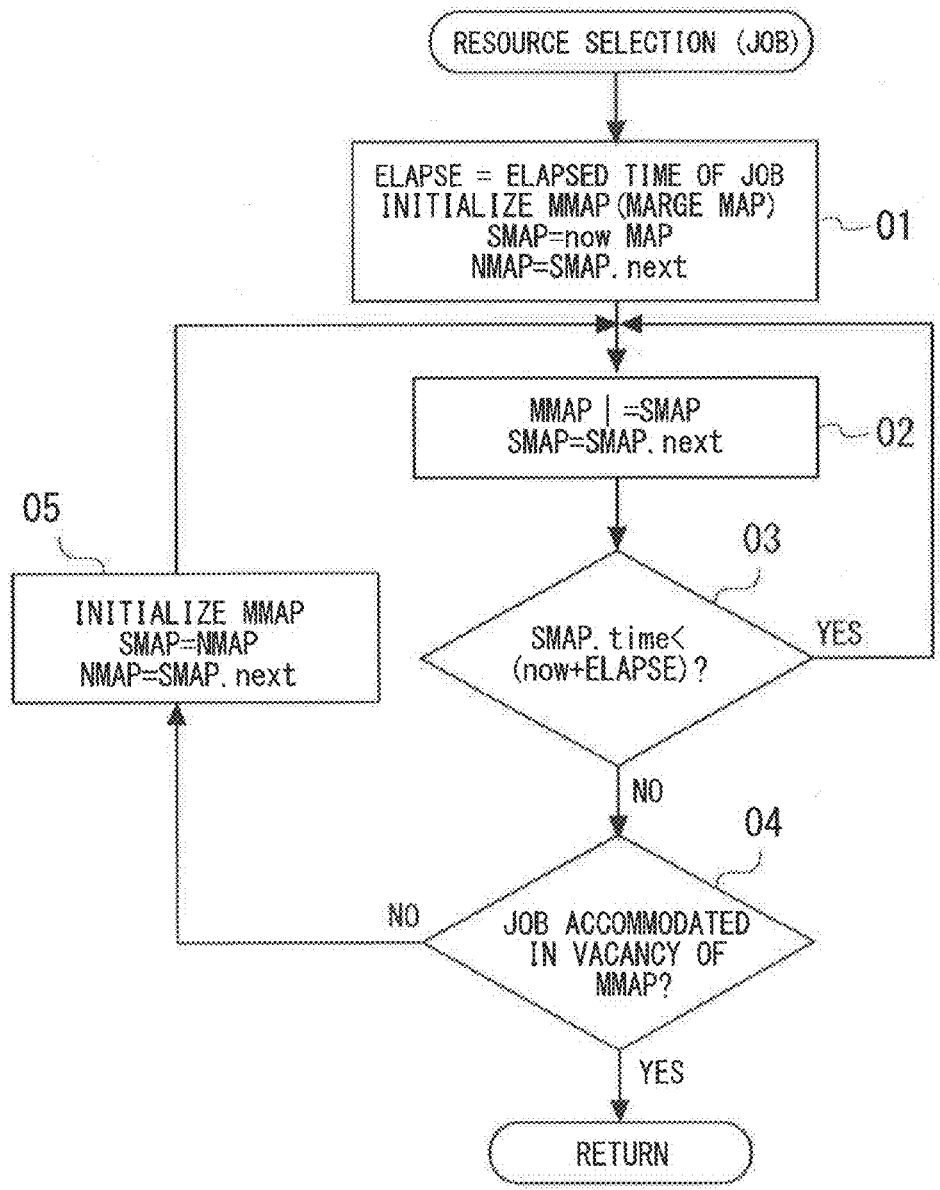
FIG. 8 illustrates a flow chart illustrating the vacant resource search process in Reference Example.

FIG. 8 illustrates a flow chart illustrating Reference Example of the vacant resource search process. The process illustrated in FIG. 8 is an example of the subroutine which can be applied to the resource selection process illustrated in FIG. 2. With reference to FIG. 8, at first, in 01, the elapsed time of the selected job "JOB" (argument of subroutine) is set for a variable "ELAPSE (elapsed time)". Furthermore, a variable "MMAP (merge map)" is initialized. Moreover, the now map is set as a variable "SMAP (initial resource map)", and "SMAP.next (resource map next to SMAP)" is set for the value of a variable "NMAP (next resource map)".

The process of 01 will be explained in accordance with the example illustrated in FIG. 7. The elapsed time "40 minutes" of "jobA" as "JOB" is set as the value of "ELAPSE". Furthermore, the now map is set as "SMAP", and the resource map (2) is set as "NMAP".

In 02, a disjunction of MMAP (initial value of the merge map) and SMAP (now map) is calculated, and the value of SMAP is retained as MMAP. "SMAP.next (resource map next to SMAP)" is set for "SMAP". In accordance with the example illustrated in FIG. 7, the resource map (2) next to the now map is set as SMAP.

Subsequently, in 03, it is determined whether or not the value of the variable "SMAP.time (time point of SMAP)" is smaller than the time point obtained by adding the value of "ELAPSE" to the now (current time). In accordance with the example illustrated in FIG. 7, it is determined whether or not the time point of the resource map (2) is included in the time point after the elapse of the elapsed time "40 minutes" of "jobA" from the current time.

In 03, when "SMAP.time" is smaller than the value of "(now+ELAPSE)" (03, YES), the process returns to 02. When "SMAP.time" is not smaller than the value of "(now+ELAPSE)" (03, NO), the process proceeds to 04. In accordance with the example illustrated in FIG. 7, the time point of the resource map (2) is earlier than the time point after the elapse of 40 minutes from the current time. Therefore, the process returns to 02.

In the process of 02 performed again, the disjunction of the now map and the resource map (2) is calculated in accordance with the OR operation for MMAP and SMAP. Furthermore, the next resource map (3) is set as SMAP.

After that, in the process of 03, the time point of the resource map (3) is earlier than the elapse of 40 minutes from the current time, and hence the process returns to 02 again. The merge map A2 is determined by the OR operation for MMAP (merge map A1) and SMAP (resource map (3)). Furthermore, the resource map (4) next to the resource map (3) is set to SMAP.

Subsequently, in the process of 03, the time point of the resource map (4) is later than the time point after the elapse of 40 minutes from the current time (03, NO), and hence the process proceeds to 04. In 04, it is determined whether or not "JOB", i.e., "jobA" is accommodated in the vacant resource of MMAP (merge map).

In this situation, when any vacant resource exists (04, YES), then the process illustrated in FIG. 8 comes to an end (returns), and "jobA" is allocated to the vacant resource. On the contrary, when any vacant resource does not exist (04, NO), the process proceeds to 05. When an explanation is made in accordance with the example illustrated in FIG. 7, any vacant resource, to which "jobA" can be allocated, does not exist in the merge map A3. Therefore, the process proceeds to 05.

In 05, MMAP is initialized. Furthermore, the value of NMAP is set for SMAP, and the value of SMAP.next is set for NMAP. In accordance with the example illustrated in FIG. 7, the resource map (2) is set as SMAP, and the resource map (3) is set as NMAP.

When the process of 05 is completed, then the process returns to 02, and the value of the resource map (2) is retained by the OR operation of the initial value of MMAP and SMAP. Furthermore, the resource map (3) is set as SMAP. Subsequently, in 03, the judgment of "YES" is made based on the time point of the resource map (3), and the process returns to 02.

In 02 executed again, the disjunction of the resource map (2) and the resource map (3) is calculated as MMAP. Furthermore, the resource map (4) is set as SMAP. Subsequently, in 03, the time point of the resource map (4) is equal to or later than 40 minutes after the current time. Therefore, the judgment of "NO" is made, and the process proceeds to 04. In 04, it is determined that any vacant resource, to which "jobA" can be allocated, does not exist in the merge map, and the process proceeds to 05. In 05, MMAP is initialized, the resource map (3) is set as SMAP, and the resource map (4) is set as NMAP.

After that, the process returns to 02, and the loop process of 02 and 03 is executed. Accordingly, the process proceeds to 04 in the state in which the disjunction (merge map B) of the resource map (3) and the resource map (4) is calculated as MMAP, for the following reason. That is, in 03, the time point of the resource map (5) does not fulfill the condition of 03. Then, in 04, the vacant resource, to which "jobA" can be allocated, is found in MMAP (merge map B) (04, YES). Accordingly, the process illustrated in FIG. 8 comes to an end, and "jobA" is allocated to the vacant resource.

<Closed Space>

Next, an explanation will be made about the "closed space" as the search target in the resource search process in this embodiment. A situation sometimes arises such that some of the calculation nodes (calculation node groups) are "not allocated until a certain time point" and "allocated (scheduled) at and after the time point". When any vacant time, which has a length of not less than the scheduled execution time of the unallocated job, does not exist in relation to the set of the calculation nodes to fulfill both of the conditions of the spatial arrangement and the number of the calculation nodes required for the unallocated job at this point in time, it is impossible to allocate the job with respect to the set of the calculation nodes.

The "calculation resource", which is composed of a pair of the set of the calculation nodes "not allocated until a certain time point" and "allocated (scheduled) at and after the time point" and the time period provided before the set of the calculation nodes is completed for the allocation, is referred to as "closed space" in this specification. In the example illustrated in FIG. 6, the vacant area, which is disposed at the left corner of the scheduling map, corresponds to the closed space. When the spatial arrangement of the set of the calculation nodes is a two-dimensional rectangle or a three-dimensional rectangular parallelepiped, the whole of the respective "closed spaces" (including the time axis) form the three-dimensional or four-dimensional resource.

The set of the calculation nodes for forming the closed space (spatial axis of the "closed space") can be considered as "resource having time limit of use" at and before the time point at which the allocation is completed. That is, the closed space is the resource which can be allocated to the job that can fulfill the condition of allocation of the spatial axis and the condition of allocation of the time axis. In this context, the condition of allocation of the spatial axis is the condition that relates to the number of the calculation nodes and the arrangement situation of the set of the calculation nodes, and the condition of allocation of the time axis is such a condition that the time required until arrival of the time point at which the allocation is already completed is longer than the time required for the job.

Problem to be Solved in this Embodiment

Figure 2:
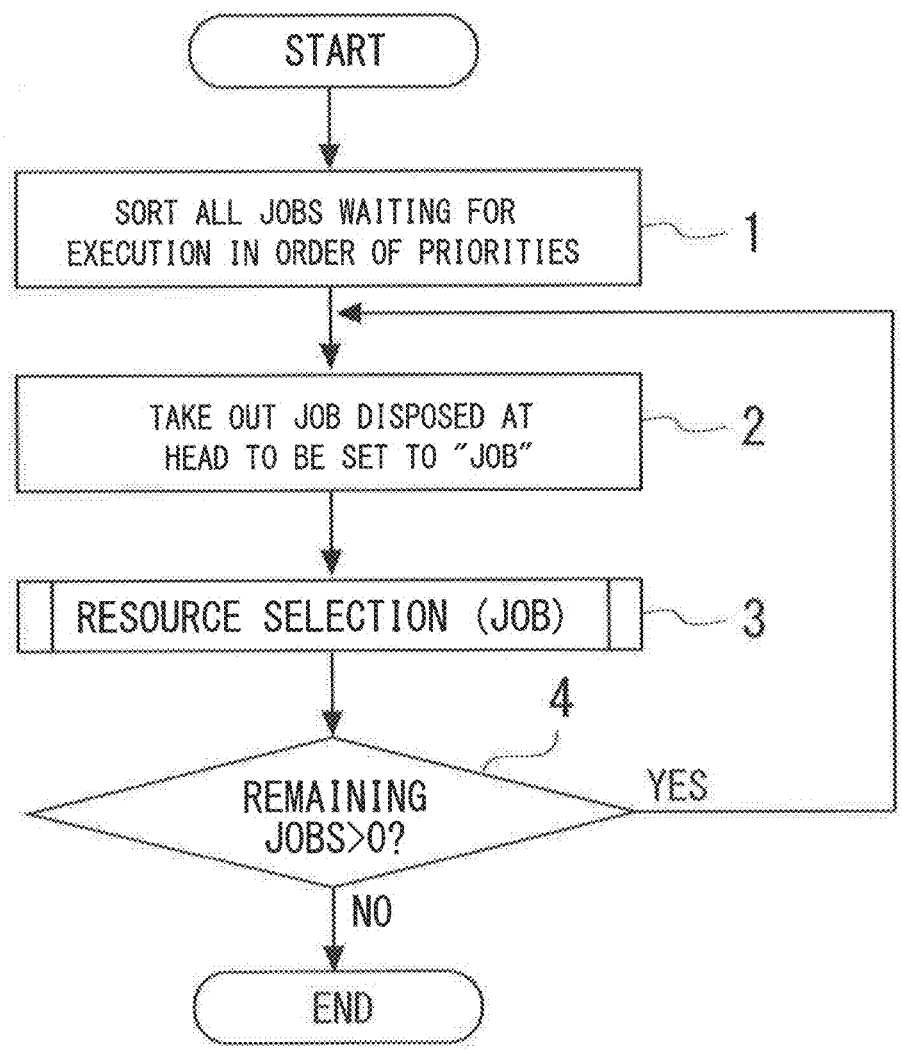
FIG. 2 illustrates a flow chart illustrating a flow of a "job selection" process and a "calculation resource selection" process.

When it is intended to search the closed space by applying the vacant resource search process (Reference Example) as explained with reference to FIGS. 7 and 8 in the calculation resource selection process illustrated in FIG. 2, the following problem has arisen. That is, the vacant resource search process of Reference Example is the process which takes a long time for repeating the calculation of the disjunction of the resource maps including the now map and the investigation of the vacant node.

Therefore, when the scale of the parallel computer system is increased, it takes a long time to perform the vacant resource search process as viewed from the whole of the jobs waiting for the execution (allocation). For this reason, as explained below, a situation sometimes occurs such that the vacant time period is substantially shortened on account of the "search process time for the vacant resource", and the calculation resource, to which no job is allocated, appears.

As explained above, in the calculation resource selection process, the vacant resource search (set of the nodes capable of being allocated and the time period capable of being used) and the allocation are performed one by one for the plurality of jobs sorted in an order starting from those having higher priorities. In other words, the vacant resource search process is started later for the jobs which have lower priorities in the job sequence sorted in the job selection process. As a result, such a situation may arise that the opportunity is lost to allocate a certain job to the "closed space" to which the certain job can be allocated.

Figure 9:
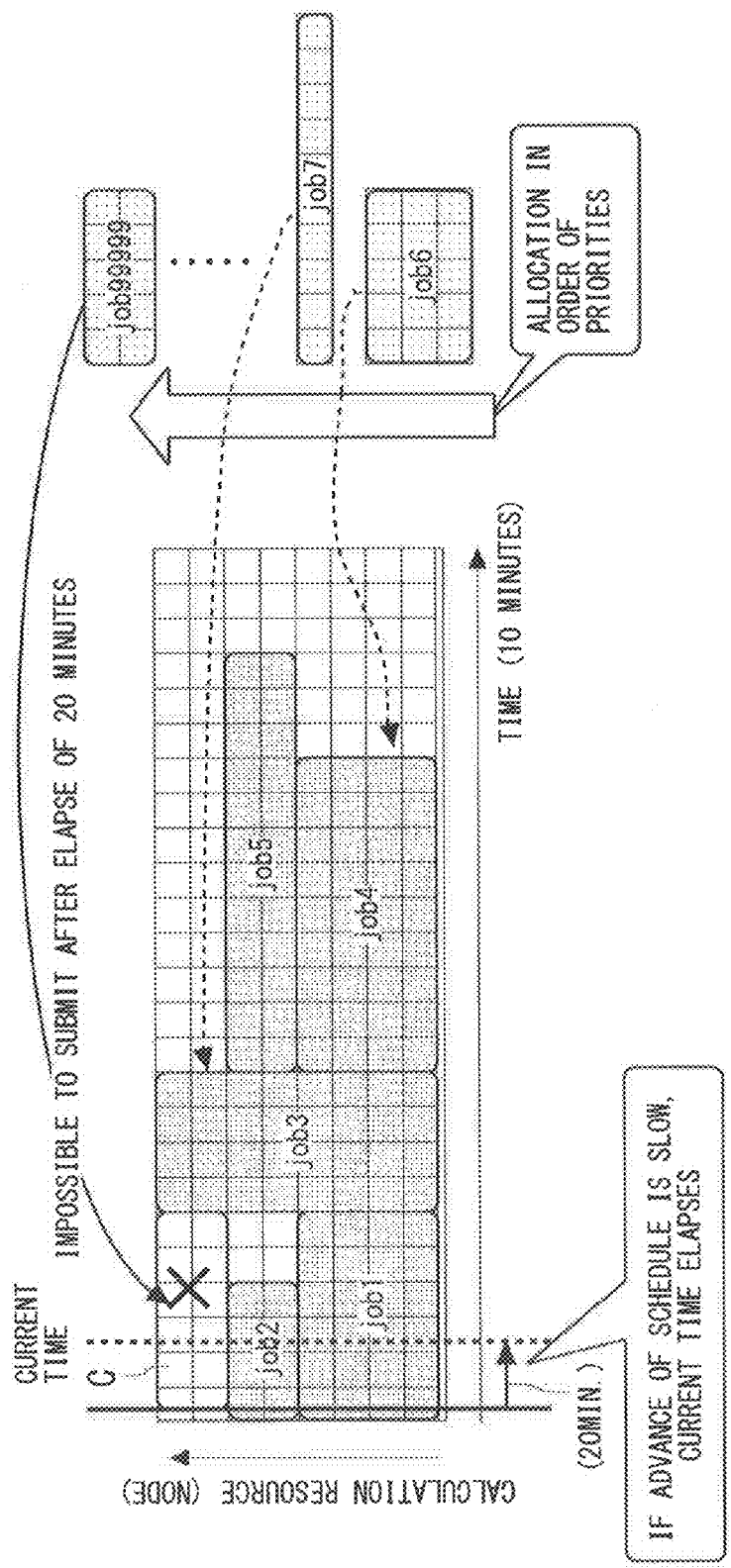
FIG. 9 illustrates a specified example of the problem described above.

FIG. 9 illustrates a specified example of the problem described above. In the example illustrated in FIG. 9, the vacant resource C (see the upper-left portion of the scheduling map), in which the two calculation nodes can be used for 55 minutes, exists at the current time. Then, it is assumed that the calculation resource selection process is executed for the unallocated jobs waiting for execution of about hundred thousand from "job6" to "job99999". The resource quantity is sometimes expressed as "x nodes xx minutes" by using the number of calculation nodes and the time period. The resource quantity of the vacant resource described above is "2 nodes 55 minutes".

The job "job99999", for which the vacant resource search process is started in the 99999th turn, is included in the plurality of unallocated jobs. The required resource quantity of the job "job99999" is 2 nodes and 50 minutes. Therefore, when the vacant resource search process and the allocation are executed for the job "job99999" within 5 minutes from the current time, the vacant resource C can be utilized.

However, when the number of calculation nodes is increased, the time, which is required for the vacant resource search per one job, is prolonged. Furthermore, a long time is required for the job having the low priority such as the job "job99999" until the start of the vacant resource search (allocation) of the job. For example, it is assumed that 20 minutes elapse until the start of the vacant resource search for the job "job99999".

In this case, the current time is moved to a position indicated by a broken line. In the case of the current time as described above, the resource quantity of the vacant resource C is 2 nodes and 35 minutes on account of the shortening of the time length. Therefore, it is impossible to allocate the job "job99999" to the vacant resource C. As a result, the resource corresponding to an amount of 2 nodes and 55 minutes, which existed at the point in time of the allocation of "job6", becomes useless, and the operating ratio of the resource is lowered.

An explanation will be made below about a method for controlling the parallel computer system to execute the job allocation method capable of solving the problem described above.

<Closed Space Priority Control Process (Closed Space Search)>

Figure 10:
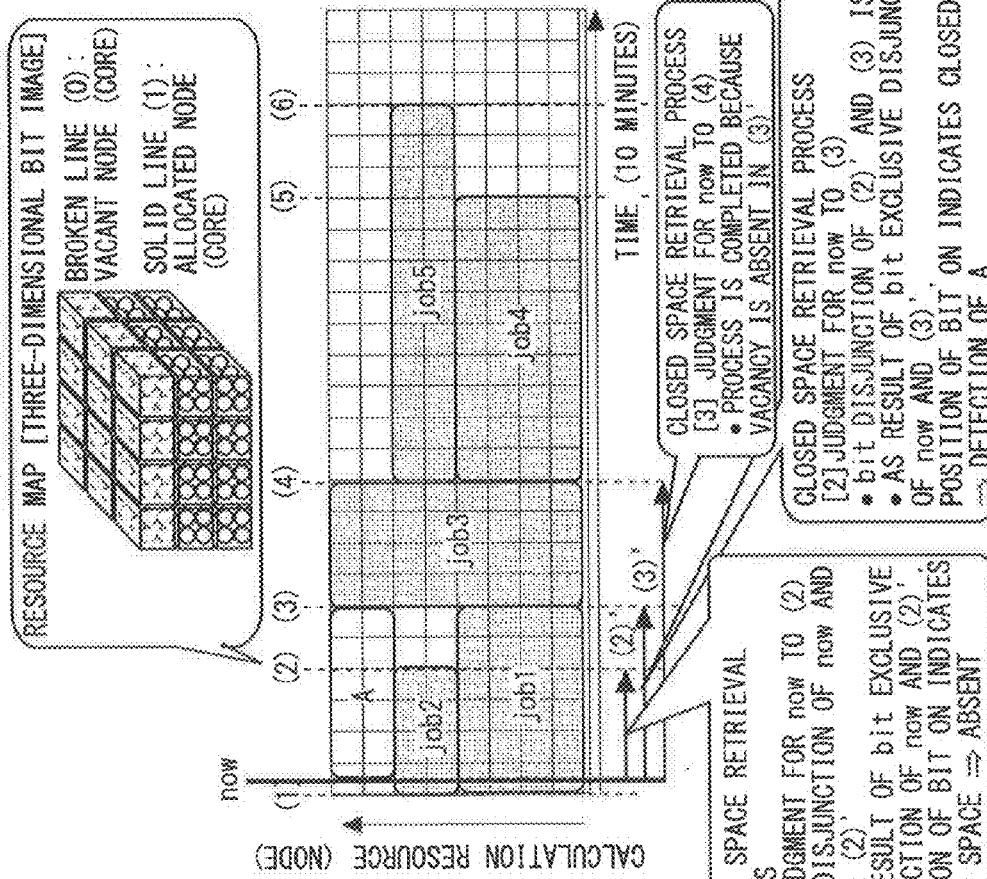
FIG. 10 illustrates a closed space priority control process according to an embodiment.

FIG. 10 illustrates a closed space priority control process according to an embodiment. In the example illustrated in FIG. 10, the allocation has been already completed for each of the job "job1" to the job "job5" on the scheduling map. As a result thereof, the closed space A exists at the upper-left corner of the scheduling map.

The resource quantity of the closed space A as viewed from the current time is "2 nodes and 55 minutes". In this embodiment, the vacant resource such as the closed space A, in which some of the calculation nodes are in the vacant state over the range between the current time and the scheduled start time point of a certain job ("job3" in FIG. 10), is designated as the closed space of the search target. In the following explanation, some of the plurality of calculation nodes in the vacant state are sometimes referred to as "vacant node" as well.

The job scheduler (CPU 11 to operate as the job scheduler) detects the closed space A as follows.

(Procedure 1)

At first, the job scheduler determines the presence or absence of the closed space in the range ranging from the current time "now" to the time point of the resource map (2) (scheduled end time point of "job2"). That is, the job scheduler calculates a disjunction (bit disjunction) of the bit conversion value of the now map and the bit conversion value of the resource map (2) to provide a merge map (2)'.

Subsequently, the job scheduler calculates an exclusive disjunction (XOR) of the now map and the resource map (2)'. The position of bit "ON" in the exclusive disjunction indicates the closed space formed by the vacant node. However, the exclusive disjunction (XOR) of the now map and the merge map (2)' resides in all bits "OFF". Therefore, the closed space A is not detected.

(Procedure 2)

Subsequently, the job scheduler determines the presence or absence of the closed space A in the range ranging from the current time "now" to the time point of the resource map (3) (scheduled end time point of "job1" and scheduled start time point of "job3"). That is, the job scheduler calculates a disjunction of the merge map (2)' and the resource map (3) to provide a merge map (3)'.

(Procedure 3)

Subsequently, the job scheduler calculates an exclusive disjunction (XOR) of the now map and the merge map (3)'. The position of bit "ON" is detected in the exclusive disjunction. The position indicates the closed space A. That is, the position of bit "ON" indicates the vacant node. The time period between the current time "now" and the time point of the resource map (3) indicates the time period in which the vacant node can be used.

After that, the job scheduler attempts the judgment of the presence or absence of the closed space in the range ranging from the current time "now" to the time point of the resource map (4) (scheduled end time point of "job3"). However, no vacant area exists in the resource map (3). Therefore, the search for the closed space comes to an end.

(Procedure 4)

When the closed space A is found, the job scheduler retrieves the job to be accommodated in the closed space A from the unallocated jobs. In the example illustrated in FIG. 10, the jobs "job6" to "job99999" are present as the unallocated jobs. Specifically, a list of the unallocated jobs (not illustrated) is stored in the memory 12. The respective jobs "job6" to "job99999" are sorted in an order of priorities. Furthermore, the list retains the number of nodes (number of required nodes) required for the execution of the respective jobs "job6" to "job99999" and the elapsed time (require time for execution).

The job scheduler executes the comparison between the node number and the time length of the closed space A and the required node number and the elapsed time of each of the jobs "job6" to "job99999" in the list, in an order starting from those having higher priorities (sorted order). When the job scheduler finds the job in which the required node number is accommodated in the node number of the closed space A and the elapsed time is accommodated in the time length of the closed space A, then the job scheduler completes the retrieval, and the job scheduler allocates the job to the closed space A. For example, the job "job99999", which is accommodated in the closed space A, is found, and the job "job99999" is allocated to the closed space A.

Figure 11:
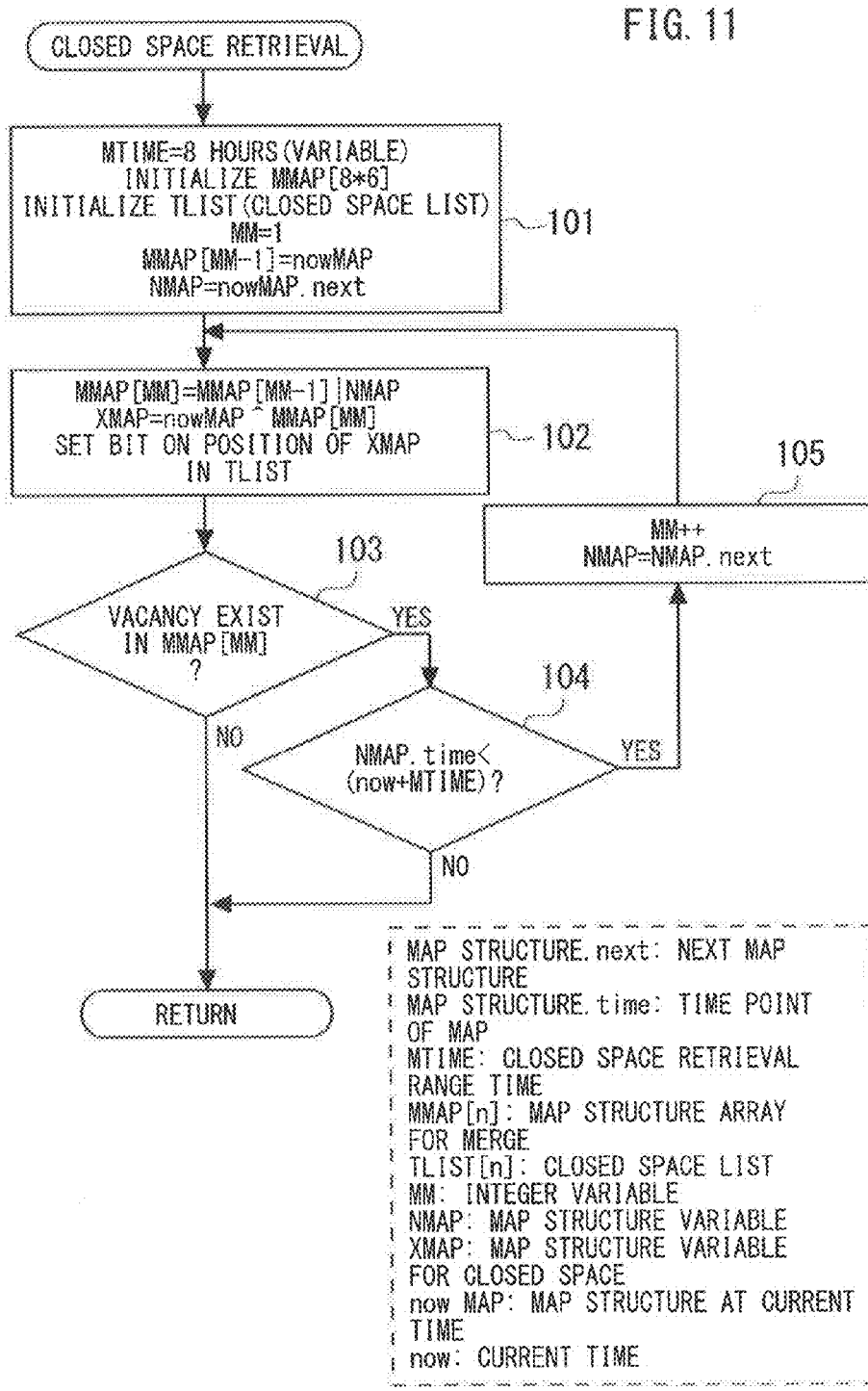
FIG. 11 illustrates a flow chart illustrating an example of a closed space search process explained with reference to FIG. 10.

FIG. 11 illustrates a flow chart illustrating an example of the closed space search process explained with reference to FIG. 10. The process is executed by CPU 11. It is assumed that the allocation of the "job1" to "job5" has been already completed as illustrated in FIG. 10 at the point in time of the start of the process illustrated in FIG. 11, and the information about the now map and the resource maps (1) to (6) is generated by CPU 11 and stored in the memory 12. Then, it is assumed that the process illustrated in FIG. 11 is started at the point in time of the allocation process for the job "job6".

With reference to FIG. 11, at first, in 101, the following process is performed. That is, CPU 11 sets a predetermined time for a variable "MTIME". MTIME indicates the time range to perform the retrieval for the closed space. In the example illustrated in FIG. 11, 8 hours are set as MTIME. However, the value of MTIME can be appropriately set. As for the value of MTIME, it is possible to apply the value inputted into the job management apparatus 10 by an operator by using an unillustrated console (input device and output device). It is possible to adjust the execution time of the closed space priority control process by adjusting the length of MTIME.

CPU 11 performs the initialization of MMAP (merge map) in accordance with the set value of MTIME. In the example illustrated in FIG. 11, in accordance with the setting of MTIME=8 hours, an array of 480 minutes (8×6=48) is initialized at intervals of 10 minutes. Furthermore, CPU 11 sets the value of a variable MM (counter value) to "1". Moreover, CPU 11 sets the now map as MMAP[MM−1], and CPU 11 sets "now map.next" as NMAP. The process in 101 is explained in accordance with the example illustrated in FIG. 10. The now map is set as MMAP[MM−1], and the resource map (2) is set as NMAP. "MMAP[MM]" indicates the map structure array for the merge map.

Subsequently, in 102, CPU 11 calculates a disjunction of MMAP[MM−1] and NMAP as MMAP[MM] (merge map in the case of MM=1). An explanation is made in accordance with the example illustrated in FIG. 10 such that a disjunction of the now map and the resource map (2) (merge map (2)') is calculated.

Furthermore, CPU 11 calculates an exclusive disjunction of the now map and MMAP[MM] as a variable "XMAP" (map structure variable for closed space). That is, an exclusive disjunction of the now map and the merge map (2)' illustrated in FIG. 10 is calculated. Moreover, CPU 11 sets the bit on position of XMAP in TLIST (closed space list).

Subsequently, in 103, CPU 11 determines whether or not any vacant node exists in MMAP[MM] (merge map (2)'). In this procedure, when any vacant node does not exist (103, NO), the closed space search process comes to an end. On the contrary, when any vacant node exists (103, YES), the process proceeds to 104.

When the process proceeds to 104, CPU 11 determines whether or not the variable "NMAP.time (time point of NMAP)" is smaller than the time point obtained by adding the value of "MTIME" to now (current time). An explanation is made in accordance with the example illustrated in FIG. 10. CPU 11 determines whether or not the time point of the resource map (2) is within the time (8 hours) set as MTIME from the current time. The time point of the resource map (2) is within 8 hours, and hence the process proceeds to 105. When NMAP.time exceeds 8 hours from the current time, the closed space search process is finished.

When the process advances to 105, CPU 11 increments the value of the variable MM (MM=2). Furthermore, CPU 11 sets the value of NMAP to NMAP.next (resource map (3)), and CPU 11 returns the process to 102. In the process of 102 performed again, CPU 11 calculates, as MMAP [MM=2], the merge map (3)' which is a disjunction of MMAP[MM=1] (merge map (2)') and NMAP (resource map (3)). Furthermore, CPU 11 calculates, as XMAP, an exclusive disjunction of the now map and the merge map (3)', and CPU 11 sets the bit on position of XMAP in TLIST.

In the process of 103 performed again, CPU 11 completes the closed space search process, because no vacant node exists in MMAP [MM] (merge map (3)'). CPU 11 can recognize the bit on position set in TLIST as the vacant node. Furthermore, CPU 11 can specify the resource map, for example, from the value of MM (counter value), and CPU 11 can recognize that the calculation node in the vacant state is the vacant resource (closed space) in the time period between the time point of the resource map and the current time. Accordingly, it is possible to specify the closed space A (node number and time period (time length)).

In place of the process illustrated in FIG. 11, the following procedure is also available. That is, when the disjunction (merge map) of the now map and the resource map disposed immediately after the now map is calculated, it is determined (103) whether or not any vacant resource exists in the merge map. When the vacant resource exists, the operation of the exclusive disjunction (calculation of XMAP) is performed. In this way, when any vacant resource does not exists in the disjunction (merge map) of the now map and the resource map disposed immediately after the now map, then it is possible to complete the process illustrated in FIG. 11, and it is possible to shorten the closed space search process.

The closed space search process described above can be started at a predetermined timing, for example, in a state in which the plurality of jobs are allocated to the resources. For example, after the job selection process and the calculation resource selection process are completed for all of the sets of the jobs (job sequences) coordinated in the job acceptance process described above, it is possible to perform the execution in a form of being separated from these processes.

Alternatively, it is also allowable that the closed space search process is executed in a form of interruption (insertion) at an appropriate timing in the calculation resource selection process. For example, the closed space search process can be executed before and after the allocation for one job (calculation resource selection process). Further alternatively, it is also allowable that the closed space search process is executed every time when the allocation is completed for a predetermined number of jobs, the number being not less than two. Further alternatively, it is also allowable that the closed space search process is executed at periodic timings (constant time intervals) after the job sequence is generated by the sorting in the job selection process. Further alternatively, the execution of the closed space search process can be also started after receiving an execution start instruction inputted into the job management apparatus 10.

Function and Effect of First Embodiment

In the closed space priority control process according to the embodiment, when the closed space A is found by the closed space search process, and the job, which is accommodated in the closed space A, is retrieved from the unallocated jobs, then the job is preferentially allocated even when any unallocated job having a priority higher than that of the job exists. Accordingly, it is possible to avoid such a situation that the resource, which relates to the closed space A as illustrated in FIG. 9, becomes useless on account of the elapse of the current time. In other words, it is possible to mitigate such a situation that the vacant resource in the gap becomes useless on account of the elapse of the current time. Accordingly, it is possible to improve the operating ratio of the resource.

The closed space priority control process is such a process that the job, which can be allocated to the closed space found by the closed space search process, is retrieved by using all of the unallocated jobs as the targets, and the detected job is allocated. Therefore, the closed space priority control process is different from the ordinary vacant resource search process, i.e., the process in which one job is selected in accordance with the priority, and the resource, to which the selected job can be allocated, is searched.

The closed space search process is performed by the accumulative OR operation for the now map and the resource map and the EXCLUSIVE-OR operation for the OR operation result and the now map. The closed space search process is the simple logical operation as described above, which is the short time process performed for the target of the time period ranging from the current time to the execution start time point for a certain allocated job. Furthermore, the retrieval process for retrieving the job accommodated in the closed space is performed by comparing the node number and the time length of the closed space with the required node number and the elapsed time (time required for execution) of the unallocated job. Therefore, it is possible to complete the comparison for all of the unallocated job in a short time.

In this way, in the case of the job allocation in which the closed space search and the job search are used, the process can be completed in a short time as compared with the job allocation performed in the ordinary vacant resource search process. Therefore, the time is shortened, which elapses until the corresponding job is allocated to the closed space generated at a certain current time. Therefore, it is possible to effectively utilize the vacant resource (closed space) in the gap in order to improve the operating ratio.

Furthermore, for this reason, the closed space priority control process described above can be combined with the ordinary allocation process (scheduling) based on the order of priorities. In this case, the closed space priority control process is performed with respect to the closed space formed by the job allocation based on the order of priorities. Therefore, the job, which is allocated to the closed space, does not disturb the execution start of the allocated job.

Moreover, as described above, the closed space priority control process is performed while using, as the target, the time period ranging from the current time to the scheduled start time point of a certain allocated job, and hence it is possible to complete the closed space priority control process in a short time. Therefore, when the closed space priority control process is combined with the ordinary job allocation based on the order or priorities, the influence, which is exerted on the allocation process based on the order of priorities, is small. In other words, it is possible to suppress the influence exerted on the total required time for the scheduling with respect to all of the unallocated jobs.

However, the fact that the plurality of allocated jobs for forming the closed space are allocated in the order of priorities is not an essential condition. The closed space priority control process may be applied to a job allocation situation in which the allocation is performed in accordance with any order or any allocation method based on something other than the priority. For example, the closed space priority control process according to this embodiment is also applicable to the scheduling in which the jobs are allocated to the resources in an order of input (in an order of acceptance) of the jobs.

Furthermore, the retrieval of the job capable of being allocated to the closed space is executed in the order of priorities. Therefore, the closed space priority control process can be executed in accordance with the priority. However, the order or sequence of the retrieval is not limited to the order of priorities, and the execution can be performed in accordance with any appropriate rule.

Second Embodiment

Next, a second embodiment will be explained. The configuration of the second embodiment includes portions which are common to those of the first embodiment. Therefore, an explanation will be principally made about different features, and the common features are omitted from the explanation. The closed space search process, which is explained in the first embodiment, can contribute to the improvement in the operating ratio, when the closed space is found by the execution of the closed space search process. On the contrary, when the closed space cannot be found, the closed space search process may merely cause any loss of time.

As explained in the first embodiment, the closed space search process can be started under various conditions. However, when the frequency of the closed space search process is uselessly increased, then the loss of time described above is increased to such an extent that the loss of time cannot be ignored, and it is feared that the deterioration of the scheduling performance of the job scheduler may be caused. Therefore, the following procedure is conceived. That is, the situation, in which the closed space exists, is predicted, and the closed space search process is executed only when the possibility of existence of the closed space is high.

Figure 12:
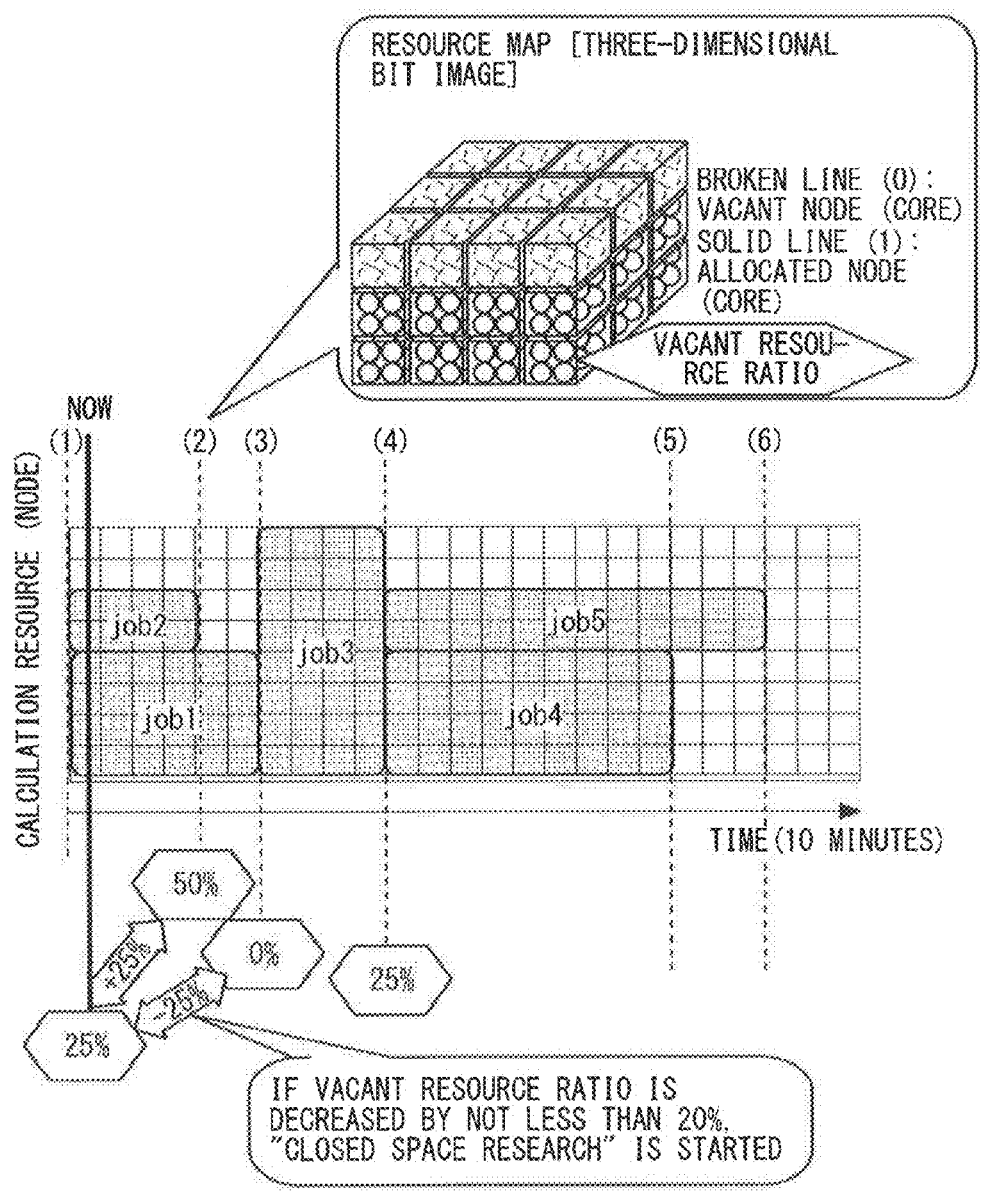
FIG. 12 illustrates a resource search method based on vacant resource ratio management according to a second embodiment.

FIG. 12 illustrates a closed space search method based on vacant resource ratio management according to the second embodiment. As illustrated in FIG. 12, in the second embodiment, the vacant resource ratio is included in the information of the resource map managed by the job management apparatus 10 (stored in the memory 12). The vacant resource ratio indicates the occupancy rate of the vacant node or nodes (vacant resource or resources) with respect to all of the calculation nodes (all of the resources) in the resource map.

In the second embodiment, CPU 11 checks the vacant resource ratio of the resource map at and after the current time every time when the job is allocated. When the decrease by not less than a predetermined quantity (for example, 20[%]) is caused as compared with the vacant resource ratio provided at the current time as a result of the checking, then the closed space search process explained in the first embodiment is started, and thus the execution of any useless closed space search process is avoided.

In the example illustrated in FIG. 12, the vacant resource ratio of the resource map (now map) at the current time is 25%. Then, the vacant resource ratio of the resource map after the current time is checked. When the vacant resource ratio is lowered by not less than a predetermined quantity (for example, 20[%]) as compared with the vacant resource ratio at the current time, the closed space search is executed.

With reference to FIG. 12, the vacant resource ratio of the resource map (2) is 50% which is increased by 25[%] as compared with the vacant resource ratio of the now map. Therefore, the closed space search process is not started. On the contrary, the vacant resource ratio of the resource map (3) is 0% which is decreased by 25[%] as compared with the vacant resource ratio of the now map. Therefore, the closed space search process is started.

As for the decrease in the vacant resource ratio of a certain resource map as compared with the vacant resource ratio provided at the current time, it is highly probable that the job, which forms the tail end (end time point) of the closed space, is allocated, as exemplified by "job3" illustrated in FIG. 12. That is, it is highly probable that the closed space exists. Accordingly, in the second embodiment, a threshold value is provided for the quantity of decrease from the vacant resource ratio provided at the current time so that the closed space search process is executed only in a situation in which it is highly probable that the closed space exists. The threshold value for the quantity of decrease (amount of decrease from the vacant resource ratio provided at the current time) can be appropriately set.

Figure 13:
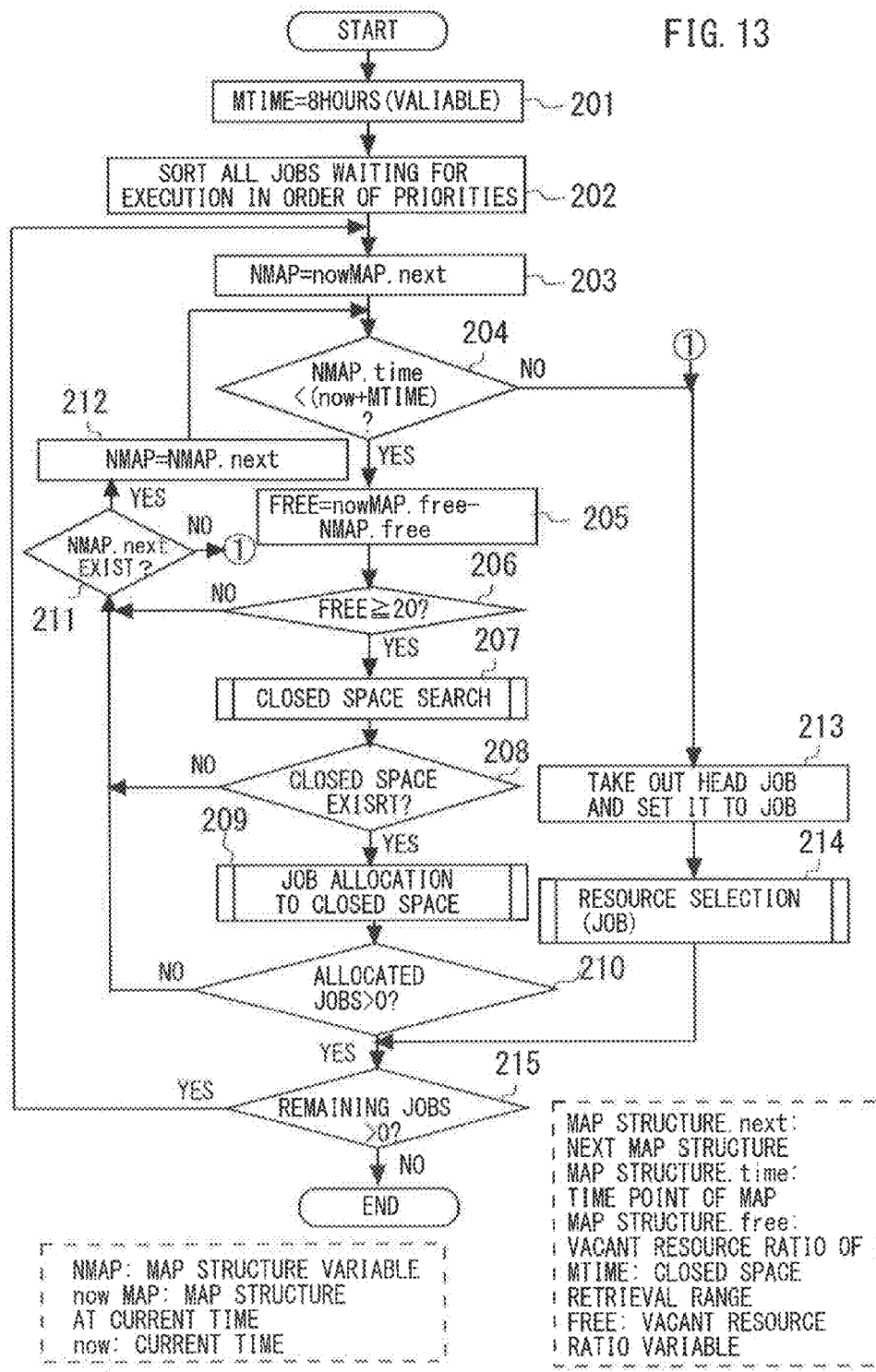
FIG. 13 illustrates a flow chart illustrating an exemplary closed space search process taking a vacant resource ratio into consideration.

FIG. 13 illustrates a flow chart illustrating an exemplary closed space search process taking the vacant resource ratio into consideration. The process illustrated in FIG. 13 corresponds to the "job selection process" and the "calculation resource selection process" explained above, and the process is started at the timing of the start of the "job selection process". For example, at the point in time of the start of the process illustrated in FIG. 13, for example, as illustrated in FIG. 12, it is assumed that the allocation of "job1" to "job5" is already completed, and the information of the now map and the resource maps (1) to (6) is prepared by CPU 11 and stored in the memory 12.

When the process illustrated in FIG. 13 is started, in 201, CPU 11 sets the closed space search range time (search range) as the variable "MTIME". The length of the closed space search range time is variable (can be appropriately set). In this embodiment, for example, 8 hours are set.

Subsequently, in 202, CPU 11 sorts all of the jobs waiting for execution (unallocated jobs) in an order starting from those having higher priorities. Subsequently, in 203, CPU 11 sets the value of the variable "NMAP" to "now map.next (resource map next to the now map)". In accordance with the example illustrated in FIG. 12, the resource map (2) is set as the "now map.next".

Subsequently, in 204, CPU 11 determines whether or not the value of the variable "NMAP.time" is smaller than the value of "(now+MTIME)". That is, CPU 11 determines whether or not the time point of the resource map corresponding to NMAP comes earlier than the time point elapsed by the time (8 hours) of MTIME from the current time. When the condition of 204 is fulfilled (204, YES), the process proceeds to 205. When the condition of 204 is not fulfilled (204, NO), the process proceeds to 213.

In 205, CPU 11 determines the value "FREE" (amount of decrease from the vacant resource ratio of the now map) obtained by subtracting "NMAP.free (vacant resource ratio of NMAP)" from "now map.free (vacant resource ratio of now map (current time))". Subsequently, in 206, CPU 11 determines whether or not the value of "FREE" is not less than the predetermined threshold value (20[%]). In this procedure, when the value of "FREE" is not less than 20 (206, YES), the process proceeds to 207. When the value of "FREE" is less than (206, NO), the process proceeds to 211.

In 207, CPU 11 calls and executes the subroutine of the closed space search process illustrated in FIG. 11. When the closed space search process comes to an end, then the process proceeds to 208, and CPU 11 determines whether or not the closed space is found. When the closed space is found (208, YES), the process proceeds to 209. When the closed space is not found (209, NO), the process proceeds to 211.

In 209, CPU 11 executes the job allocation process with respect to the closed space. That is, as explained in the first embodiment, CPU 11 retrieves the job accommodated in the closed space, from the jobs waiting for execution. When the job is found, the job is allocated to the closed space, even when any unallocated job having a priority higher than the priority of the job exists. After that, the process proceeds to 210. When the job accommodated in the closed space is not found in 209, the process also proceeds to 210.

In 210, CPU 11 determines whether or not the number of jobs allocated to the closed space is larger than 0 (not less than 1). In this procedure, when the number of jobs is not less than 1 (210, YES), the process proceeds to 215. When the number of jobs is less than 1 (210, NO), the process proceeds to 211.

In 211, CPU 11 determines whether or not the resource map, which corresponds to "NMAP.next" (resource map next to the present NMAP), exists. When the corresponding resource map exists (211, YES), the process proceeds to 212. When the corresponding resource map does not exist (211, NO), then the vacant resource ratio cannot be investigated any more, and hence the process proceeds to 213.

In 212, CPU 11 sets NMAP (next resource map) to "NMAP.next", and CPU 11 returns the process to 204. After that, the loop of 204 to 212 is repeated until the judgment of NO is made in 204 or 211.

When the process proceeds to 213, CPU 11 takes out the job positioned at the head of the sequence of the jobs waiting for execution sorted in 202, and the setting is made to an argument "JOB". Subsequently, in 214, CPU 11 reads the subroutine of the resource selection to perform the resource selection process for "JOB". The subroutine illustrated in FIG. 8 is executed as the resource selection process, and the job allocation is performed in accordance with the priority.

When the job allocation is performed in 214, then CPU 11 generates the resource map with respect to the scheduled start time point and the scheduled end time point of the job, and the time points are stored in the memory 12. When the scheduled start time point and the scheduled end time point of the job are respectively overlapped with the scheduled start time point and the scheduled end time point of the previously allocated job, the existing resource map is updated, for the following reason. That is, the situation of vacant nodes (vacant resource ratio) changes in accordance with the new job allocation.

In 215, CPU 11 determines whether or not any unallocated remaining job exists. In this procedure, when the allocation is completed for all of the jobs (215, NO), the process illustrated in FIG. 13 comes to an end. On the contrary, when any remaining job exists (215, YES), CPU 11 returns the process to 203.

After that, when the loop process of 204 to 212 is executed again, and the judgment of NO is made in 204 or 211, then the process proceeds to 213, and one job is allocated in accordance with the priority (214). The process as described above is repeated until the number of remaining job becomes 0. When the number of remaining job becomes 0, the process illustrated in FIG. 13 comes to an end. In the process illustrated in FIG. 13, the now map is updated at any appropriate timing in accordance with the elapse of the current time. For example, it is also allowable that the now map is updated in conformity with the current time prior to the start of the resource selection process of 214.

According to the process illustrated in FIG. 13 concerning the second embodiment, the process is performed such that the closed space, which is formed by the job allocation, is searched in the search range for the closed space (8 hours from the current time), and the unallocated job is allocated. The closed space search process is executed only when the quantity of decrease of the vacant resource ratio exceeds the threshold value. Therefore, it is possible to avoid any useless closed space search process, and it is possible to decrease the influence exerted on the ordinary job allocation process which follows the priority.

In the explanation of FIG. 13 described above, the explanation has been made on the assumption that the jobs in execution and the jobs waiting for execution exist as the jobs completed for allocation at the start point in time of the job selection process. However, at the start point in time of the actual job selection process, the jobs waiting for execution are in the unallocated state, except for the jobs in execution. That is, the allocation state is once canceled for the jobs which are completed for allocation and which wait for execution. The sorting of the jobs in the job selection process is executed while including the jobs for which the allocation is canceled as described above, and thus it is possible to raise the accuracy of the job allocation in accordance with the priority.

Figure 14:
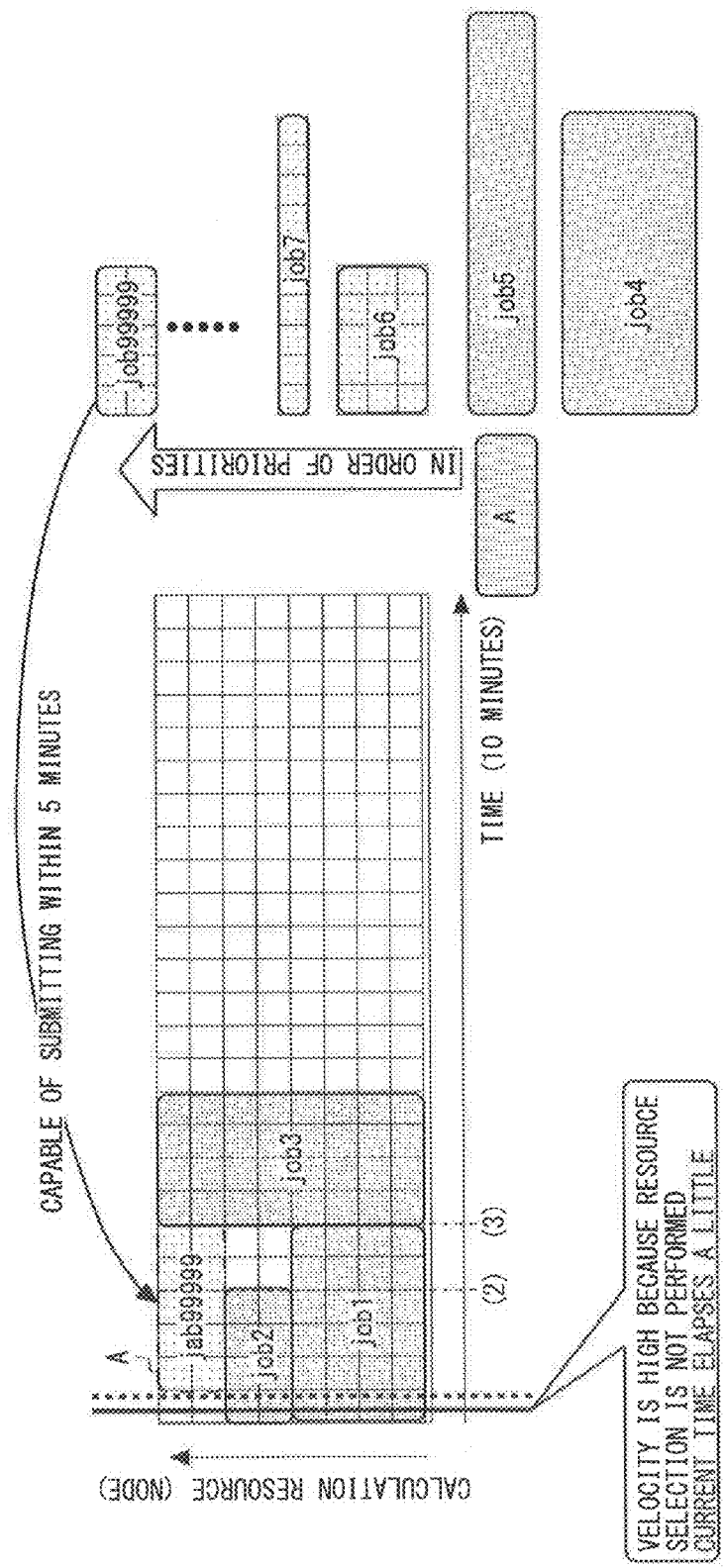
FIG. 14 illustrates a function obtained when the process illustrated in FIG. 13 is performed.

FIG. 14 illustrates a function obtained when the process illustrated in FIG. 13 is performed. It is assumed that "job1" and "job2" illustrated in FIG. 14 are the jobs which are in execution at the start point in time of the job selection process. FIG. 14 illustrates a situation in which "job3" is allocated. However, it is assumed that about hundred thousand jobs of "job3" to "job99999" are (unallocated) jobs waiting for execution.

On the assumption described above, when the process illustrated in FIG. 13 is executed, "job3" to "job99999" are sorted in 202 in an order of priorities. Subsequently, in the loop of 204 to 212, the condition of 206 is not fulfilled in relation to the resource map concerning "job1" and "job2". Furthermore, any resource map, which comes later than the scheduled end time point of "job1", does not exist. Therefore, the process proceeds to 213, the allocation for "job3" is performed in 214, and the resource map concerning "job3" is prepared. As a result of the allocation of "job3", the state illustrated in FIG. 14 is given, and the closed space A appears.

After that, when the processes of 204 and the followings are executed, then the judgment of YES is made in 206, and the closed space search process (207) is executed. As a result, the closed space A is found. When the closed space A is found, the job, which is accommodated in the closed space A, is retrieved from the unallocated jobs. That is, the jobs, which is accommodated in the closed space A, is retrieved from "job4" to "job99999" in an order of priorities. As a result, the job "job99999" of 2 nodes 50 minutes is found, and the job "job99999" is allocated to the closed space A.

FIG. 14 illustrates such a situation that the procedure, which ranges from the detection of the closed space A to the allocation of the job "job99999", is completed within 5 minutes from the current time, and the allocation of the job "job99999" to the closed space is successfully performed. Accordingly, the vacant resource, which exists nearest to the current time, is effectively utilized, and it is possible to improve the operating ratio of the system.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A parallel computer system comprising:
    a plurality of calculation nodes, each of which has a processor configured to execute a process for a job; and
    a job management apparatus configured to allocate jobs to the plurality of calculation nodes, the job management apparatus including a processor configured to execute a process including:
    searching a vacant resource generated as a result of job allocation, the vacant resource including one or more of the plurality of calculation nodes each having a vacant state in a range between current time and a scheduled start time point of a certain allocated job;
    retrieving the job allocatable to the vacant resource, from the unallocated jobs when the vacant resource is found; and
    allocating the retrieved job to the vacant resource,
    the job management apparatus further includes a memory configured to store a resource map at the current time to indicate an allocation situation of the jobs with respect to the plurality of calculation nodes at the current time, and a resource map to indicate a job allocation situation with respect to the plurality of calculation nodes at scheduled start time points and scheduled end time points of the respective allocated jobs respectively; and the controller is configured to perform a process including:
performing an OR operation for the resource map at the current time and the resource map to follow the resource map at the current time until the calculation node having the vacant state is not found in a result of the OR operation;
performing a XOR operation for a result of the OR operation obtained when the calculation node having the vacant state is not found and the resource map at the current time; and
detecting from a result of the XOR operation, as the vacant resource, one or more of the plurality of calculation nodes each having the vacant state and a time period between the current time and a time point of the resource map obtained when the calculation node having the vacant state is not found.

2. The parallel computer system according to claim 1, wherein the controller is configured to retrieve the job allocatable to the vacant resource by comparing a number of the calculation nodes forming the vacant resource and a time length with a number of required nodes for the unallocated job and a time required for execution.

3. The parallel computer system according to claim 1, wherein when the jobs are allocated in the order of priorities allocated to each job, the controller is configured to retrieve the job allocatable to the vacant resource in the order of priorities.

4. A parallel computer system comprising:
a plurality of calculation nodes, each of which has a processor configured to execute a process for a job; and
a job management apparatus configured to allocate jobs to the plurality of calculation nodes, the job management apparatus including a processor configured to execute a process including:
searching a vacant resource generated as a result of job allocation, the vacant resource including one or more of the plurality of calculation nodes each having a vacant state in a range between current time and a scheduled start time point of a certain allocated job;
retrieving the job allocatable to the vacant resource, from the unallocated fobs when the vacant resource is found; and
allocating the retrieved job to the vacant resource,
the controller is configured to compare a vacant resource ratio provided at the current time with vacant resource ratios provided at scheduled start time points and scheduled end time points of one or more allocated jobs disposed after the current time, and the controller is configured to start the process to search the vacant resource when the vacant resource ratio provided at the scheduled start time point or the scheduled end time point is decreased by not less than a predetermined quantity as compared with the vacant resource ratio provided at the current time.

5. A non-transitory computer-readable recording medium having stored therein a program for causing a computer to execute a process for allocating jobs to a plurality of calculation nodes, the process comprising:
searching a vacant resource generated as a result of job allocation, the vacant resource having one or more of the plurality of calculation nodes each having a vacant state in a range between current time and a scheduled start time point of a certain allocated job;
retrieving the job allocatable to the vacant resource, from the unallocated jobs when the vacant resource is found;
allocating the retrieved job to the vacant resource, and
storing a resource map at the current time to indicate an allocation situation of the jobs with respect to the plurality of calculation nodes at the current time, and a resource map to indicate a job allocation situation with respect to the plurality of calculation nodes at scheduled start time points and scheduled end time points of the respective allocated jobs respectively; and
the searching includes:
performing an OR operation for the resource map at the current time and the resource map to follow the resource map at the current time until the calculation node having the vacant state is not found in a result of the OR operation;
performing a XOR operation for a result of the OR operation obtained when the calculation node having the vacant state is not found and the resource map at the current time; and
detecting from a result of the XOR operation, as the vacant resource, one or more of the plurality of calculation nodes each having the vacant state and a time period between the current time and a time point of the resource map obtained when the calculation node having the vacant state is not found.

6. A method of allocating jobs to the plurality of calculation nodes, the method comprising:
searching, using a processor, a vacant resource generated as a result of job allocation, the vacant resource having one or more of the plurality of calculation nodes each having a vacant state in a range between current time and a scheduled start time point of a certain allocated job;
retrieving, using a processor, the job allocatable to the vacant resource, from the unallocated jobs when the vacant resource is found;
allocating the retrieved job to the vacant resource, and
storing a resource map at the current time to indicate an allocation situation of the jobs with respect to the plurality of calculation nodes at the current time, and a resource map to indicate a job allocation situation with respect to the plurality of calculation nodes at scheduled start time points and scheduled end time points of the respective allocated jobs respectively;
the searching includes:
performing an OR operation for the resource map at the current time and the resource map to follow the resource map at the current time until the calculation node having the vacant state is not found in a result of the OR operation;
performing a XOR operation for a result of the OR operation obtained when the calculation node having the vacant state is not found and the resource map at the current time; and
detecting from a result of the XOR operation, as the vacant resource, one or more of the plurality of calculation nodes each having the vacant state and a time period between the current time and a time point of the resource map obtained when the calculation node having the vacant state is not found.

7. A non-transitory computer-readable recording medium having stored therein a program for causing a computer to execute a process for allocating jobs to a plurality of calculation nodes, the process comprising:
searching a vacant resource generated as a result of job allocation, the vacant resource having one or more of the plurality of calculation nodes each having a vacant state in a range between current time and a scheduled start time point of a certain allocated job;

retrieving the job allocatable to the vacant resource, from the unallocated jobs when the vacant resource is found;

allocating the retrieved job to the vacant resource, and comparing a vacant resource ratio provided at the current time with vacant resource ratios provided at scheduled start time points and scheduled end time points of one or more allocated jobs disposed after the current time, and the searching is started when the vacant resource ratio provided at the scheduled start time point or the scheduled end time point is decreased by not less than a predetermined quantity as compared with the vacant resource ratio provided at the current time.

8. A method of allocating jobs to the plurality of calculation nodes, the method comprising:

searching, using a processor, a vacant resource generated as a result of job allocation, the vacant resource having one or more of the plurality of calculation nodes each having a vacant state in a range between current time and a scheduled start time point of a certain allocated job;

retrieving, using a processor, the job allocatable to the vacant resource, from the unallocated jobs when the vacant resource is found;

allocating the retrieved job to the vacant resource, and comparing a vacant resource ratio provided at the current time with vacant resource ratios provided at scheduled start time points and scheduled end time points of one or more allocated jobs disposed after the current time, and the searching is started when the vacant resource ratio provided at the scheduled start time point or the scheduled end time point is decreased by not less than a predetermined quantity as compared with the vacant resource ratio provided at the current time.

* * * * *